UNITED STATES PATENT OFFICE.

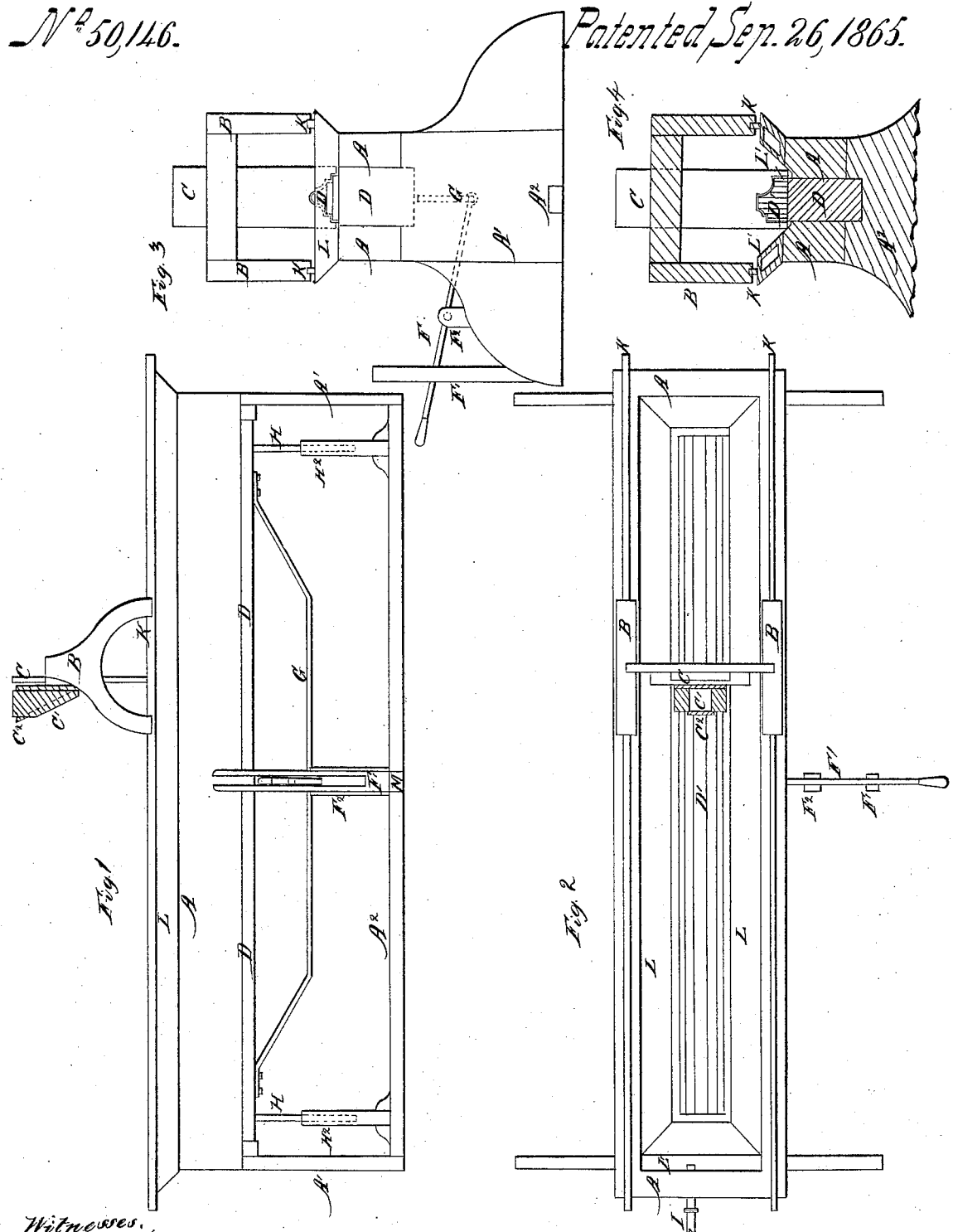

BENJAMIN McEACHREN, OF SAN FRANCISCO, CALIFORNIA.

IMPROVEMENT IN APPARATUS FOR ENAMELING MOLDINGS.

Specification forming part of Letters Patent No. 50,146, dated September 26, 1865.

*To all whom it may concern:*

Be it known that I, BENJAMIN MCEACHREN, of the city and county of San Francisco, State of California, have invented a new, useful, and Improved Enameling-Machine for Enameling Moldings; and I do hereby declare that the following specification, with the accompanying drawings, is sufficient to enable any person skilled in the art or science to which it most nearly appertains to make and use my said improved invention without further invention or experiment.

The nature of my invention consists in providing an enameling-bath with a movable bottom to raise the molding or work being enameled up out of the enamel or paste, so that it may be acted on by an enameling-tool moved by a traversing carriage, and in applying a steam-chamber to an enameling-bath to keep the enamel hot and fit for use; also, in combining with a traversing carriage an enameling-tool and hopper to supply the enameling material.

In the accompanying drawings, Figure 1 is a side elevation. Fig. 2 is a plan of the top; Fig. 3, an elevation of one end. In these drawings the same letters indicate like parts in each of the figures.

In these drawings, A is the frame, supported by the ends or standards A' A', which are connected at their lower ends by the bar $A^2$, the whole making a strong frame, to which the other parts of the machine are connected or fastened.

L L is an enameling-bath box or vat arranged in the frame A, and surrounded by a steam-chamber, L', (shown in black in section Fig. 4,) which may be supplied with steam through the pipe I, to heat the bath and keep it hot, when desired. The bottom D D, Fig. 1, of the bath-box is movable, and fitted to traverse up and down to raise the molding D' on it up out of the liquid enamel after it has been immersed in it. The bottom D has the bent bar G fastened to it, which bar is connected to the lever F, which works in the standards F' $F^2$, to raise and lower the bottom D when required.

The standards F' $F^2$ are fastened to the bar M from the bar $A^2$. The traverse-rods H H project down from the bottom D, and are fitted to work in the hollow standard $H^2$ $H^2$, fastened to the bar $A^2$. These traverse or guide rods H steady the bottom D as it is moved up and down, and prevent it from tipping.

K K are ways fastened to the top of the frame or bath-box for the carriage B B to traverse on, which carries the enameling tool, scraper, or rubber C, which is traversed on the molding D' by moving the carriage B on the ways K.

C' is a hopper fastened to the carriage B, and provided with a slide, $C^2$, to graduate the supply of the material in the hopper.

The enamel for the molding is made of glue and whiting, in a manner well known to enamelers, and the bath and hopper may be supplied with it, so that when the molding is applied to the bottom D the bottom and molding may be depressed, so that the enamel will flow over the moldings, and then raised up in contact with the tool or rubber C, which is traversed on the molding as long as required to enamel it properly, the end of the tool C being made to fit the molding being enameled; and, when necessary, some enamel may be supplied to the molding from the hopper C' on the carriage B.

What I claim as my invention and improvement in enameling-baths is—

1. A movable bottom for raising the work or moldings up out of the enamel or paste, substantially as described.

2. In combination with the enameling-bath, the steam-chamber for heating the bath and keeping it hot, substantially as described.

3. The combination of the traversing carriage, hopper, and enameling-tool, substantially as described, for the purpose set forth.

BENJAMIN McEACHREN.

Witnesses:
 C. W. M. SMITH,
 THOS. TANNATT.